United States Patent
Kato et al.

(10) Patent No.: US 9,711,255 B2
(45) Date of Patent: Jul. 18, 2017

(54) ULTRAVIOLET-EMITTING MATERIAL AND ULTRAVIOLET LIGHT SOURCE

(71) Applicant: STANLEY ELECTRIC CO., LTD., Meguro-ku, Tokyo (JP)

(72) Inventors: Hiroyuki Kato, Kanagawa-ken (JP); Kazufumi Tanaka, Tokyo (JP); Takahiro Matsumoto, Kanagawa-ken (JP)

(73) Assignee: STANLEY ELECTRIC CO., LTD, Tokyo (JP)

( * ) Notice: Subject to any disclaimer, the term of this patent is extended or adjusted under 35 U.S.C. 154(b) by 0 days.

(21) Appl. No.: 14/993,752

(22) Filed: Jan. 12, 2016

(65) Prior Publication Data
US 2016/0211046 A1    Jul. 21, 2016

(30) Foreign Application Priority Data

Jan. 16, 2015   (JP) ................. 2015-006323
Jan. 16, 2015   (JP) ................. 2015-006324

(51) Int. Cl.
*C09K 11/55*   (2006.01)
*G21K 5/00*   (2006.01)
*H01J 63/06*   (2006.01)

(52) U.S. Cl.
CPC ............ *G21K 5/00* (2013.01); *C09K 11/55* (2013.01); *H01J 63/06* (2013.01)

(58) Field of Classification Search
CPC . G21K 5/00; G21K 5/04; C09K 11/55; C09K 11/00
USPC .................. 250/493.1, 494.1, 504 R, 504 H
See application file for complete search history.

(56) References Cited

U.S. PATENT DOCUMENTS

| 8,487,285 B2 | 7/2013 | Matsumoto et al. |
| 2012/0161609 A1 | 6/2012 | Ono et al. |
| 2013/0119381 A1* | 5/2013 | Inoue ................ C09K 11/623 257/43 |

FOREIGN PATENT DOCUMENTS

| JP | 2011232242 A | 11/2011 |
| JP | 2012199174 A | 10/2012 |
| WO | 2012014415 A1 | 2/2012 |

OTHER PUBLICATIONS

Extended European Search Report dated Jul. 7, 2016, issued in counterpart European Application No. 16151086.2.
Yong, et al., "The wurtzite-rocksalt phase transition for a BexMgyZn1-x-yO alloy: Be content vs Mg content", Journal of Alloys and Compounds; vol. 608, Apr. 24, 2014, pp. 197-201.

* cited by examiner

*Primary Examiner* — Nicole Ippolito
(74) *Attorney, Agent, or Firm* — Holtz, Holtz & Volek PC

(57) ABSTRACT

There is provided an ultraviolet-emitting material that is formed so as to include $Mg_{1-x}Zn_xO$ ($0<x<0.55$) with a rock-salt structure or $Be_{1-x-y-z}Mg_yZn_xCa_zO$ ($0.45 \leq y+z<1$, $0<x\leq 0.55$) with a rock-salt structure.

18 Claims, 18 Drawing Sheets

| | DIRECTION [100] | DIRECTION [110] |
|---|---|---|
| MgO SUBSTRATE |  |  |
| MgO LAYER |  |  |
| $Mg_{0.8}Zn_{0.2}O$ LAYER |  |  |
| $Mg_{0.61}Zn_{0.39}O$ LAYER |  |  |

| $Mg_{1-x}Zn_xO$ LAYER 52 | CL PEAK WAVELENGTH | HALF WIDTH |
|---|---|---|
| x=0 | 184nm | |
| x=0.02 | 200nm | ABOUT 18 nm |
| x=0.05 | 218nm | ABOUT 25 nm |
| x=0.20 | 233nm | ABOUT 25 nm |
| x=0.39 | 252nm | ABOUT 25 nm |

| x | $E_{peak}$ (RS) |
|---|---|
| 0.01 | 6.359 |
| 0.025 | 6.200 |
| 0.08 | 5.767 |
| 0.14 | 5.536 |
| 0.173 | 5.391 |
| 0.196 | 5.322 |
| 0.28 | 5.082 |
| 0.39 | 4.930 |

| CRYSTAL STRUCTURE | LATTICE CONSTANT[nm] | BANDGAP ENERGY[eV] |
|---|---|---|
| RS-ReO | 0.3648※ | 10.96※ |
| RS-MgO | 0.4216 | 7.8 |
| RS-ZnO | 0.4271※ | 4.33※ |
| RS-CaO | 0.48152 | 7.7 |
| WZ-BeO | 0.2698 | 10.6 |
| WZ-WgO | 0.343※ | 7.16※ |
| WZ-ZnO | 0.325 | 3.37 |

(※ REPRESENTS THEORETICAL VALUE.)

ELECTRON BEAM

VACUUM ULTRAVIOLET TO
DEEP ULTRAVIOLET LIGHT

VACUUM ULTRAVIOLET TO
DEEP ULTRAVIOLET LIGHT

VACUUM ULTRAVIOLET TO
DEEP ULTRAVIOLET LIGHT

FIG. 11

| MATERIAL | CRYSTAL STRUCTURE | LATTICE CONSTANT | MOHS HARDNESS | TRANSMISSION RANGE | MELTING POINT |
|---|---|---|---|---|---|
| $MgO$ | ROCK-SALT STRUCTURE | a=0.4213nm | 6 | 0.18~8.5μm | 2850°C |
| $Al_2O_3$ | CORUNDUM | a=0.4758nm c=1.2991nm | 9 | 0.17~6.5μm | 2030°C |
| $SiO_2$ | α-CRISTOBALITE | a=0.4914nm c=0.5405nm | 7 | 0.15~4.5μm | 1610°C |
| $MgF_2$ | RUTILE (FLUORITE) | a=0.464nm c=0.306nm | 6 | 0.11~7.5μm | 1248°C |
| $CaF_2$ | RUTILE (FLUORITE) | a=0.5462nm | 4 | 0.13~10μm | 1418°C |
| $BaF_2$ | RUTILE (FLUORITE) | a=0.6196nm | 3 | 0.15~15μm | 1354°C |
| $LiF$ | ROCK-SALT STRUCTURE | a=0.4026nm | 4 | 0.105~7μm | 845°C |

| | DIRECTION [100] | DIRECTION [110] |
|---|---|---|
| MgO SUBSTRATE |  |  |
| MgZnO LAYER OF SAMPLE 1 ($Mg_{0.82}Zn_{0.18}O$ LAYER) |  |  |
| QUANTUM WELL LAYER OF SAMPLE 2 |  |  |
| QUANTUM WELL LAYER OF SAMPLE 3 |  |  |

|  | CL PEAK WAVELENGTH | HALF WIDTH |
|---|---|---|
| MgZnO LAYER 82 OF SAMPLE 1 | 233nm | ABOUT 27 nm |
| QUANTUM WELL LAYER 83 OF SAMPLE 2 | 228nm | ABOUT 21 nm |
| QUANTUM WELL LAYER 83 OF SAMPLE 3 | 224nm | ABOUT 17 nm |

ULTRAVIOLET-EMITTING MATERIAL AND ULTRAVIOLET LIGHT SOURCE

CROSS REFERENCES TO RELATED APPLICATIONS

This application is based upon and claims the benefit of priority of the prior Japanese Patent Applications No. JP 2015-006323 and No. JP 2015-006324, filed on Jan. 16, 2015, the entire contents of which are incorporated herein by reference.

BACKGROUND OF THE INVENTION

A) Field of the Invention

The present invention relates to an ultraviolet-emitting material and an ultraviolet light source.

B) Description of the Related Art

It is known that a magnesium oxide (MgO) crystal is used as a correcting standard sample for an electron beam excitation-type vacuum ultraviolet-emitting measurement apparatus (see Japanese Unexamined Patent Application Publication No. 2011-232242, for example). According to the description in Japanese Unexamined Patent Application Publication No. 2011-232242, light emission with a wavelength from 170 nm to 200 nm can be obtained by irradiating the magnesium oxide single crystal, which has been made to grow by an electrofusion method, with an electron beam.

However, intensity of the light emission from the MgO crystal that is obtained by the electron beam excitation is low for usage as a light source.

SUMMARY OF THE INVENTION

An object of the invention is to provide an ultraviolet-emitting material and an ultraviolet light source with novel configurations.

According to an aspect of the invention, there is provided an ultraviolet-emitting material that is formed so as to include $Mg_{1-x}Zn_xO$ (0<x<0.55) with a rock-salt structure or $Be_{1-x-y-z}Mg_yZn_xCa_zO$ (0.45≤y+z<1, 0<x≤0.55) with a rock-salt structure.

According to another aspect of the invention, there is provided an ultraviolet-emitting material with a quantum well structure that includes a well layer that is formed of an $Mg_{1-x}Zn_xO$ (0<x<0.55) single crystal with a rock-salt structure and a barrier layer that is formed of an $Mg_{1-w}Zn_wO$ (0≤w<0.45, w<x) single crystal with a rock-salt structure.

According to still another aspect of the invention, there is provided an ultraviolet-emitting material with a quantum well structure that includes a well layer and a barrier layer that are formed of a $Be_{1-x-y-z}Mg_yZn_xCa_zO$ (0.5≤y≤1, 0≤x+z≤0.5) single crystal with a rock-salt structure.

According to still another aspect of the invention, there is provided an ultraviolet light source that includes: an electron beam emitting unit that emits an electron beam; and (i) a light emitting layer with a quantum well structure that includes a well layer formed of an $Mg_{1-x}Zn_xO$ (0<x<0.55) single crystal with a rock-salt structure and a barrier layer formed of an $Mg_{1-w}Zn_wO$ (0≤w<0.45, w<x) single crystal with a rock-salt structure or (ii) a light emitting layer with a quantum well structure that includes a well layer and a barrier layer, each of which is formed of a $Be_{1-x-y-z}Mg_yZn_xCa_zO$ (0.5≤y≤1, 0≤x+z≤0.5) single crystal with a rock-salt structure, (i) the light emitting layer or (ii) the light emitting layer being arranged at a position on which the electron beam emitted from the electron beam emitting unit is incident.

According to yet another aspect of the invention, there is provided an ultraviolet light source that includes: an electron beam emitting unit that emits an electron beam; and an $Mg_{1-x}Zn_xO$ (0<x<0.55) light emitting layer with a rock-salt structure or a $Be_{1-x-y-z}Mg_yZn_xCa_zO$ (0.45≤y+z<1, 0<x≤0.55) light emitting layer with a rock-salt structure, each light emitting layer being arranged at a position on which the electron beam emitted from the electron beam emitting unit is incident.

According to the invention, it is possible to provide an ultraviolet-emitting material and an ultraviolet light source with novel configurations.

BRIEF DESCRIPTION OF THE DRAWINGS

FIG. 11 is a table illustrating physical properties of substrate materials.

DESCRIPTION OF EMBODIMENTS

A description will be given of first and second experiments that were conducted by the inventors. In the following experiments, a molecular beam epitaxy (MBE) method is used as a crystal creation method.

Figure 1:
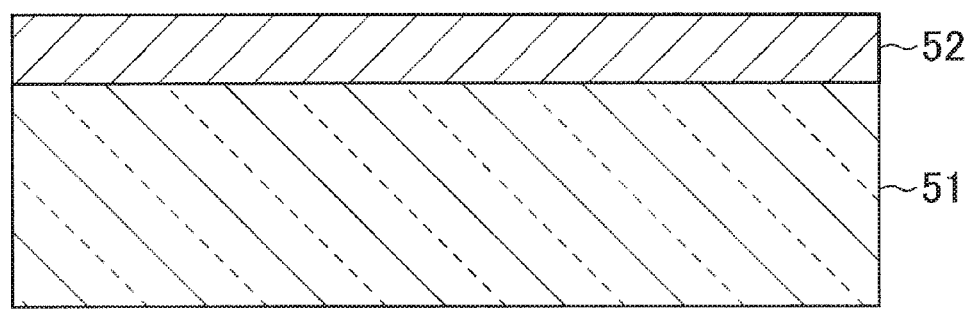
FIG. 1 is a sectional view schematically illustrating a sample that was used in a first experiment.

FIG. 1 is a sectional view schematically illustrating a sample that was used in a first experiment.

The sample was formed so as to include an MgO (100) substrate 51 and an $Mg_{1-x}Zn_xO$ layer 52 that was formed on the MgO substrate 51. The $Mg_{1-x}Zn_xO$ layer 52 was made to grow on the MgO (100) substrate 51 to have a thickness of about 200 nm by supplying Mg radical, Zn radical, and O radical in the form of molecular beams, respectively, at a growth temperature of 300° C. In the experiment, the supply amounts of Mg and Zn were changed, and a plurality of samples were produced. When x in the Zn composition is 0, the $Mg_{1-x}Zn_xO$ layer 52 was an MgO layer. In such a case, the $Mg_{1-x}Zn_xO$ layer 52 was made to grow without the supply of Zn.

Figure 2:
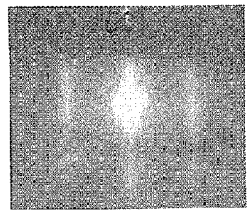
FIG. 2 illustrates RHEED images of an MgO substrate and an $Mg_{1-x}Zn_xO$ layer.
Figure 2:
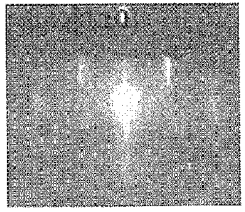
Figure 2:
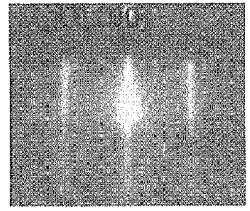
Figure 2:
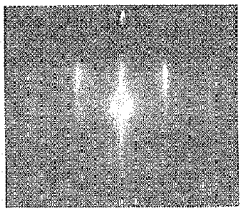
Figure 2:
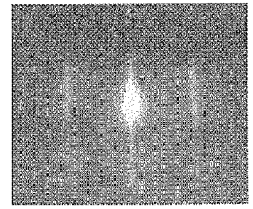
Figure 2:
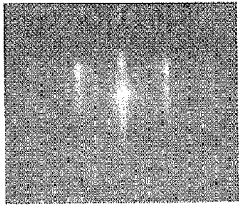
Figure 2:
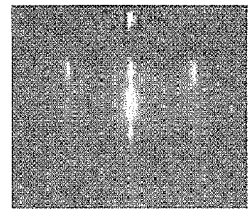
Figure 2:
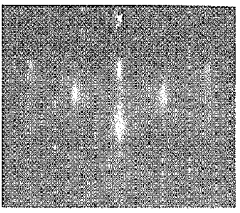

FIG. 2 illustrates reflection high energy electron diffraction (RHEED) images of the MgO substrate 51 and the $Mg_{1-x}Zn_xO$ layer 52. In FIG. 2, RHEED patterns of a surface of the MgO substrate 51 and surfaces of the $Mg_{1-x}Zn_xO$ layer 52 when x=0, x=0.20, and x=0.39 are shown in order from the upper side. Images in a case in which the electron beam was incident from the direction [100] are shown on the left side, and images in which the electron beam was incident from the direction [110] are shown on the right side. RHEED images show streak patterns in a case of a flat surface epitaxial growth (single crystal growth) in which the crystal grew in a two-dimensional manner, and RHEED images show spot patterns in a case of non-flat surface epitaxial growth (single crystal growth) in which the crystal grew in a three-dimensional manner. In a case of polycrystalline growth, RHEED images show ring patterns.

Not only the MgO substrate and the MgO layer but also all the RHEED images in the drawing show streak patterns. Based on this fact, it is possible to recognize that the MgZnO layer also achieved epitaxial growth by two-dimensional growth with high flatness as compared with the MgO substrate 51. That is, it is possible to recognize that the obtained $Mg_{1-x}Zn_xO$ layer 52 grew while maintaining a rock-salt structure (cubical crystal) that was a crystal structure of MgO at least within a range of x≤0.39. While MgO has the rock-salt structure, ZnO has a wurtzite structure (hexagonal crystal).

Figures 3A, 3B:
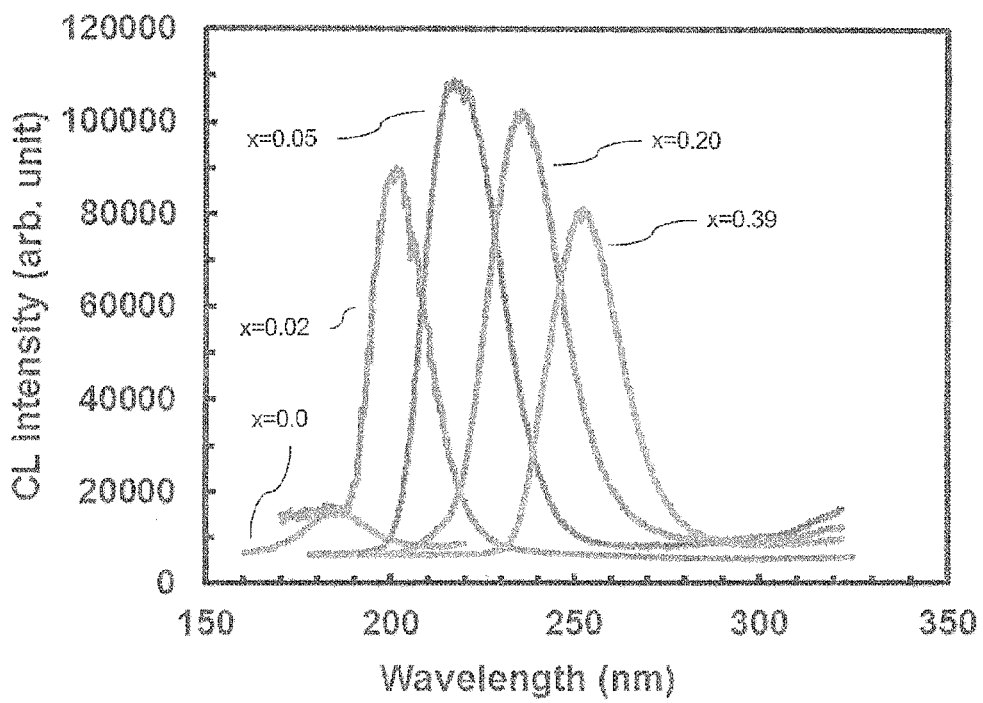
FIG. 3A is a graph illustrating CL spectra from the $Mg_{1-x}Zn_xO$ layer of the sample.
FIG. 3B is a table collectively illustrating peak wavelengths and half widths of the CL spectra.

FIG. 3A is a graph illustrating cathode luminescence (CL) spectra from the $Mg_{1-x}Zn_xO$ layers 52 of the samples, and FIG. 3B is a table illustrating peak wavelengths and half widths of the CL spectra.

Intensity of light emission from MgZnO (see the spectra when x=0.02, x=0.05, x=0.20, and x=0.39) is higher than the intensity of light emission from MgO (see the spectrum when x=0.0). For example, the peak intensity is about ten times as high as that of the light emission from MgO. It is possible to recognize that the intensity of the light emission can be significantly enhanced by setting x in the Zn composition to satisfy x>0 in $Mg_{1-x}Zn_xO$. In addition, it is also possible to recognize that the wavelength of the light emission gradually shifts toward the long wavelength side as x in the Zn composition increases.

Figures 4A, 4B:
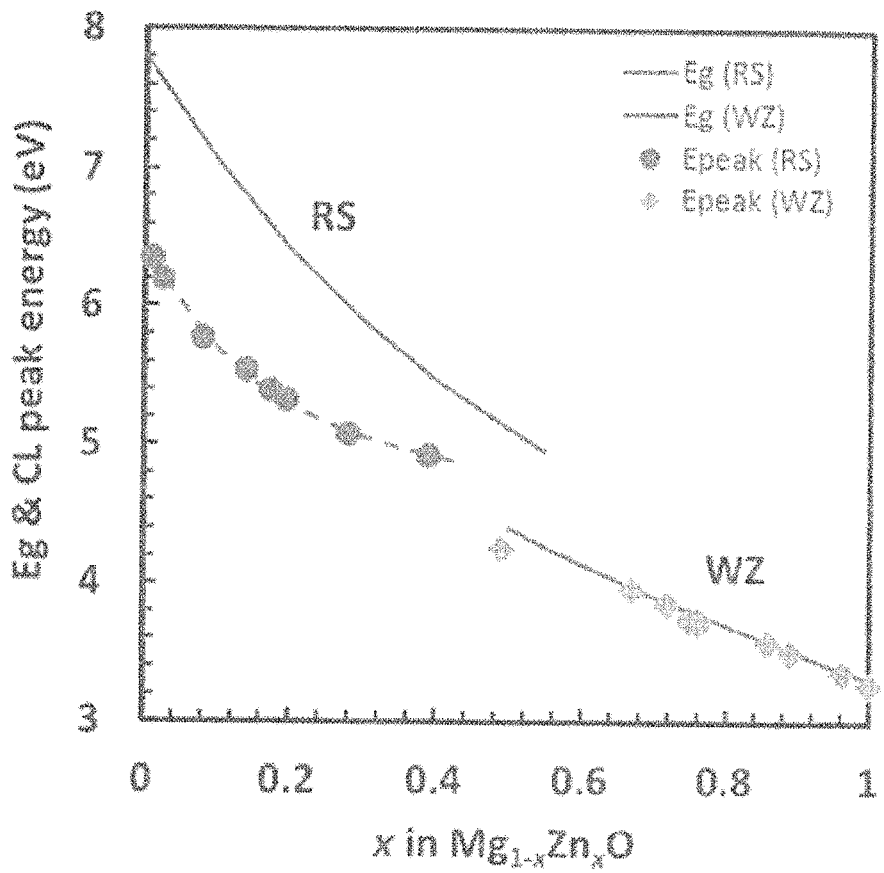
FIG. 4A is a graph illustrating dependency of bandgap energy and CL peak energy on x in a Zn composition.
FIG. 4B is a table illustrating numerical value data that represents relationships between x in the Zn composition and CL peak energy $E_{peak}$.

FIG. 4A illustrates dependency of bandgap energy and CL peak energy on x in the Zn composition. RS represents a rock-salt structure (rocksalt), and WZ represents a wurtzite structure (wurtzite). In addition, the bandgap energy is represented by a solid line, and the CL peak energy of $Mg_{1-x}Zn_xO$ with the rock-salt structure and the CL peak energy of $Mg_{1-x}Zn_xO$ with the wurtzite structure are represented by circular plotting and rhombic plotting, respectively. Although the circular plotting and the rhombic plotting were obtained by the experiment (first experiment) by the inventors, the solid line that represents the bandgap energy was created based on known material (FIG. 8 of Semicond. Sci. Technol. 20 (2005) "Pulsed laser deposition of thin films and superlattices based on ZnO" by Akira Ohtomo and Atsushi Tsukazaki). FIG. 4B collectively shows numerical value data that was obtained by the experiment conducted by the inventors (numerical value data that represents relationships between x in the Zn composition $Mg_{1-x}Zn_xO$ with the rock-salt structure and CL peak energy $E_{peak}$.

The inventors obtained a second-order approximation by using a least-squares method and discovered that the bandgap energy (illustrated by the solid line) of $Mg_{1-x}Zn_xO$ with the rock-salt structure (RS) was provided as the following Equation (1)

$$y=4.707x^2-7.716x+7.788 \qquad (1)$$

and the CL peak energy y (illustrated by the dotted line; approximate of the circular plotting) of $Mg_{1-x}Zn_xO$ with the rock-salt structure (RS) was provided as the following Equation (2)

$$y=9.562x^2-7.413x+6.383 \qquad (2).$$

As is obvious from FIG. 4A, the value of the CL peak energy substantially coincided with the value of the bandgap energy in the case of the $Mg_{1-x}Zn_xO$ crystal with the wurtzite structure. In contrast, the value of the CL peak energy greatly differed from the value of the bandgap energy in the case of the $Mg_{1-x}Zn_xO$ crystal with the rock-salt structure. This is considered to be because an origin of the CL light emission of the MgZnO layer of the samples was light emission by isoelectronic trap of Zn instead of band-edge light emission. This is also considered to be because the light emission used the isoelectronic trap, addition of Zn in a composition level as well as addition of a small amount of Zn in an impurity level thus contributed to highly efficient light emission, and the intensity of the light emission significantly increased as compared with the MgO crystal (see FIG. 3A).

It is expected from Equations (1) and (2) that the CL peak energy becomes substantially the same as the bandgap energy within a range in which x in the Zn composition is equal to or greater than 0.55. That is, it is considered that Zn functions only as a composition instead of the isoelectronic trap in the $Mg_{1-x}Zn_xO$ crystal in a range of 0.55≤x. Therefore, it would be necessary for x in the Zn composition of $Mg_{1-x}Zn_xO$ to satisfy 0<x<0.55 in order to achieve highly efficient light emission using the isoelectronic trap of Zn in the MgZnO crystal. At this time, it is considered that the $Mg_{1-x}Zn_xO$ (0<x<0.55) crystal that is obtained by adding Zn to the MgO crystal with the rock-salt structure emits light on the side of the energy that is lower than the bandgap energy by 0.1 eV or more, for example, on the side of the lower energy by about 0.1 eV to 1.4 eV.

It is possible to state based on the first experiment and consideration thereof conducted by the inventors that the MgZnO crystal with the rock-salt structure in which x in the Zn composition satisfies 0<x<0.55 has significantly high intensity of CL light emission as compared with the MgO crystal. In addition, it would be possible to achieve light emission with a peak wavelength from 190 nm to 260 nm by electron beam excitation within a Zn composition range of 0<x<0.55 from the data illustrated in FIGS. 3A and 3B. Furthermore, it is possible to state that the light emission with a wavelength from 180 nm to 280 nm can be achieved in consideration of the bottom of the light emission spectra. The wavelength of the light emission can be controlled by x in the Zn composition.

Next, a description will be given of the second experiment.

Figure 5:
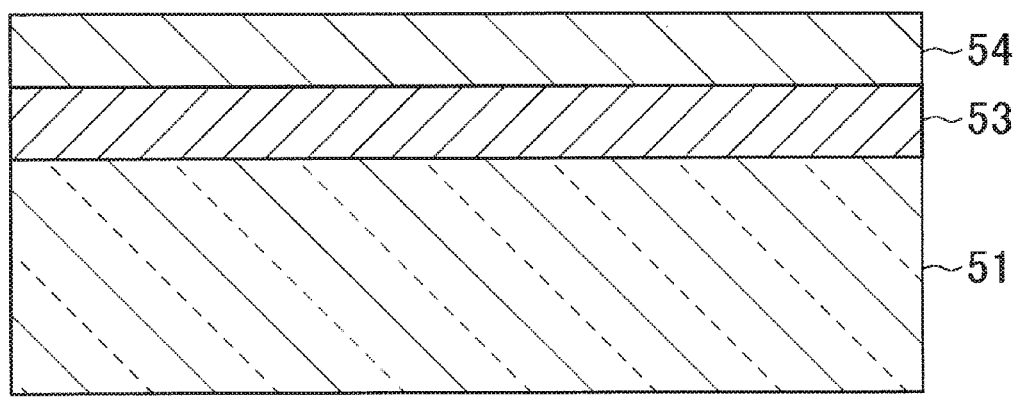
FIG. 5 is a sectional view schematically illustrating a sample that was used in a second experiment.

FIG. 5 is a sectional view schematically illustrating samples that were used in the second experiment.

The sample in the second experiment was formed to include an MgO (100) substrate 51 and a first MgZnO layer 53 and a second MgZnO layer 54 that were formed on the MgO substrate 51 in this order. The first MgZnO layer 53 was an $Mg_{0.99}Zn_{0.01}O$ (100) layer in which the Zn composition corresponded to 0.01, and the second MgZnO layer 54 was an $Mg_{0.61}Zn_{0.39}O$ (100) layer in which the Zn composition corresponded to 0.39.

The first MgZnO layer 53 and the second MgZnO layer 54 were formed on the MgO substrate 51 by supplying Mg radical, Zn radical, and O radical in the form of molecular beams at a growth temperature of 300° C. By adjusting the amount of the Mg beam and the amount of the Zn beam, the Zn composition of the first MgZnO layer 53 was set to 0.01, and the Zn composition of the second MgZnO layer 54 was set to 0.39. The thickness of both the first and second MgZnO layers 53 and 54 was about 200 nm.

Figure 6:
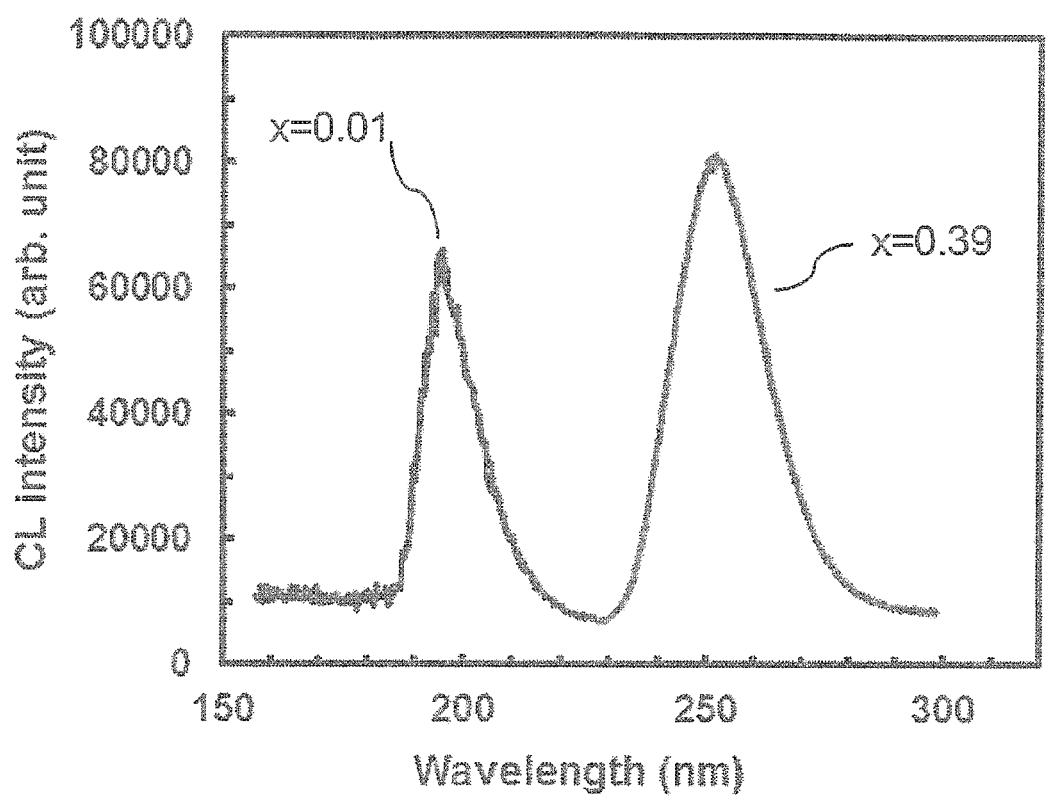
FIG. 6 is a graph illustrating CL spectra from a first MgZnO layer and a second MgZnO layer of the sample in the second experiment.

FIG. 6 illustrates CL spectra from the first MgZnO layer 53 (x=0.01) and the second MgZnO layer 54 (x=0.39) of the sample in the second experiment. The light emission with the peak wavelength of about 195 nm was observed from the first MgZnO layer 53, and the light emission with the peak wavelength of about 250 nm was observed from the second MgZnO layer 54.

It is possible to recognize from the second experiment that light emission with a plurality of wavelengths (a plurality of light emission wavelengths can be selected, and the band can be widened) can be achieved by laminating MgZnO layers with different x in the Zn composition. Since the intensity of the light emission from the MgZnO layers can be changed depending on the thicknesses of the layers, the ratio of the intensity of the light emission from the respective layers 53 and 54 can be adjusted by changing the thicknesses of the first and second MgZnO layers 53 and 54.

Figures 7A, 7B:
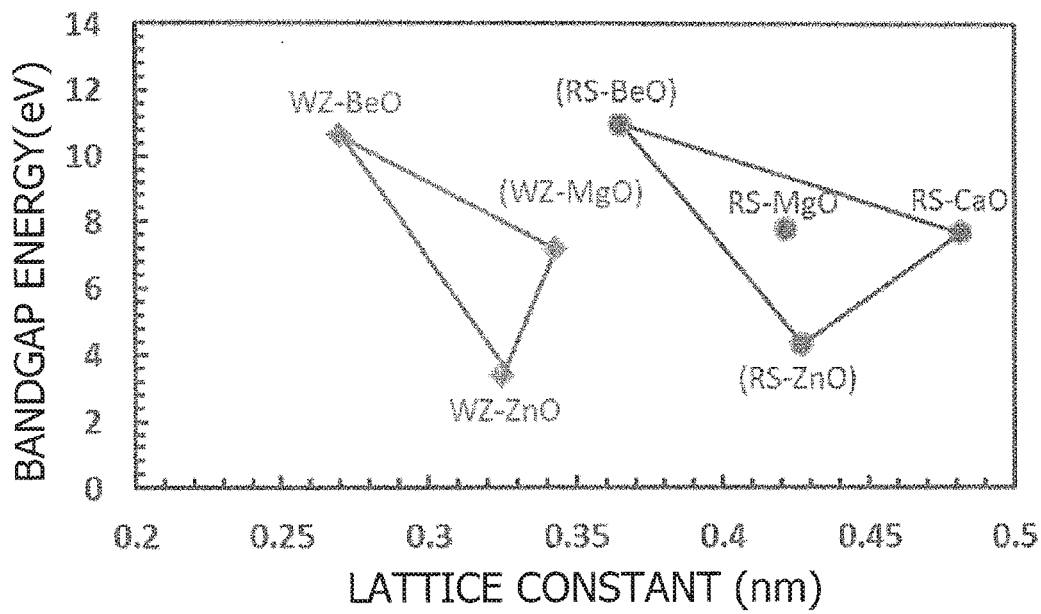
FIGS. 7A and 7B are a graph and a table that illustrate lattice constants and bandgap energy of BeO, MgO, ZnO, and CaO.

FIGS. 7A and 7B illustrate lattice constants and bandgap energy of group II oxides (BeO, MgO, ZnO, and CaO). In FIG. 7A, values in the table of FIG. 7B are plotted in the coordinate system in which the horizontal axis represents the lattice constants and the vertical axis represents the bandgap energy. Here, MgO and CaO have rock-salt structures (RS), and BeO and ZnO have wurtzite structures (WZ). Therefore, values in relation to RS-BeO, RS-ZnO, and WZ-MgO are theoretical values in FIGS. 7A and 7B. Referring to FIG. 7A, cases will be considered in which the various group II oxides and mixed crystals thereof are formed.

As described above, the $Mg_{1-x}Zn_xO$ (0<x<0.55) crystal with the rock-salt structure can realize high intensity CL light emission within the wavelength range from 180 nm to 280 nm based on the first experiment and the consideration thereof conducted by the inventors. Referring now to FIG. 7A, a wide bandgap can be achieved by addition of Be, for example, and the wavelength of the light emission can be further shortened. For example, the bandgap energy of $Be_{0.5}Mg_{0.5}O$ becomes about 9.2 eV, and the wavelength of 135 nm can be obtained by light emission of band-edge shift. If a small amount of Zn is added thereto and the isoelectronic trap of Zn is formed to have a depth of 1 eV, then the wavelength of the light emission becomes about 150 nm. In addition, it is possible to change the lattice constant without changing the bandgap energy by adding Ca.

The ultraviolet-emitting material is not limited to the aforementioned $Mg_{1-x}Zn_xO$ (0<x<0.55) crystal with the rock-salt structure, and BeMgZnCaO mixed crystal with the rock-salt structure can be used as an ultraviolet-emitting material.

In order to maintain the rock-salt structure as a crystal structure, it is preferable that at least a total of 45% of Mg and Ca, which are group II elements that form the rock-salt structure, is contained. That is, it is preferable that a composition formula $Be_{1-x-y-z}Mg_yZn_xCa_zO$ (0.45≤y+z<1, 0<x≤0.55) is satisfied. In addition, it is further preferable that the content of Mg is equal to or greater than 50% in terms of material stability. That is, it is further preferable that $Be_{1-x-y-z}Mg_yZn_xCa_zO$ (0.5≤y<1, 0<x+z≤0.5, 0<x≤0.5) is satisfied.

Figure 8A:
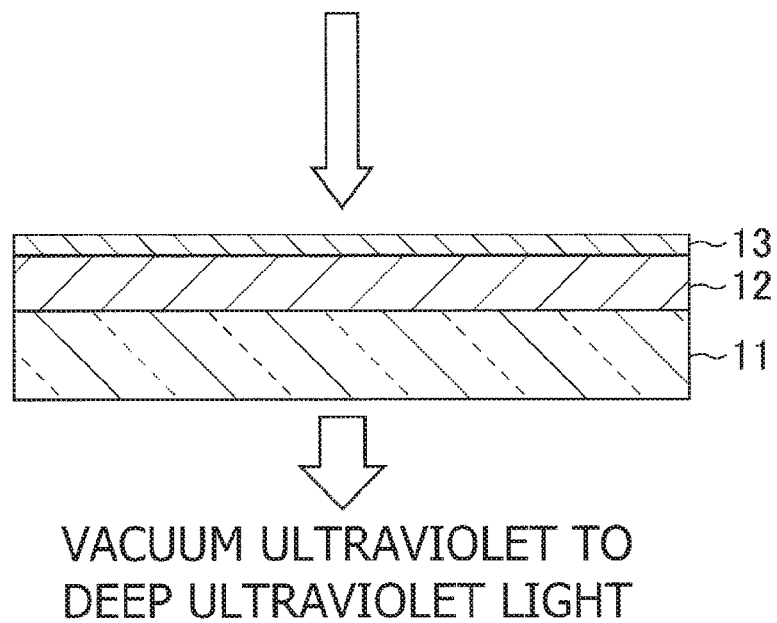
FIGS. 8A and 8B are sectional views schematically illustrating an ultraviolet light source according to a first embodiment.
Figure 8B:
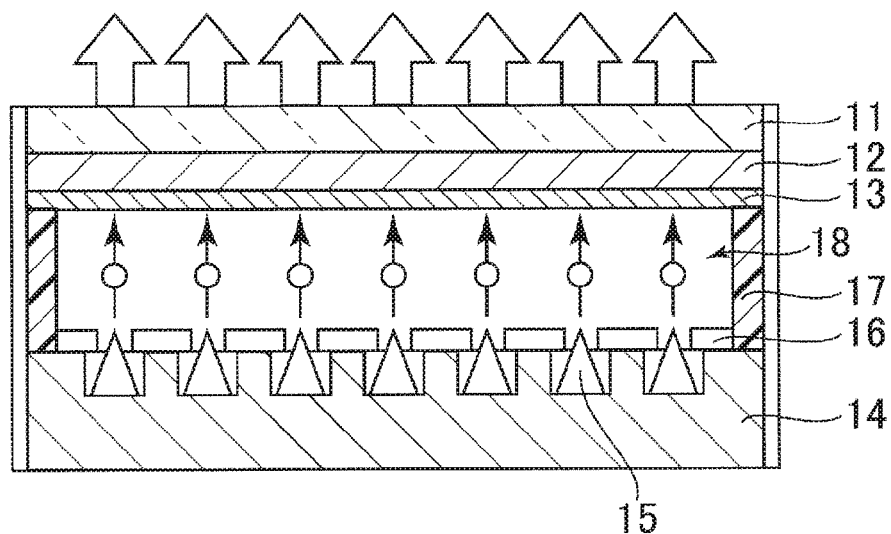

FIGS. 8A and 8B are sectional views schematically illustrating an ultraviolet light source according to a first embodiment. The ultraviolet light source according to the first embodiment is a panel-shaped light source.

As shown in FIG. 8A, the ultraviolet light source according to the first embodiment is formed to include an MgO substrate 11, an $Mg_{1-x}Zn_xO$ (0<x<0.55) layer 12 that is formed on the MgO substrate 11, and an anode electrode 13 that is formed on the $Mg_{1-x}Zn_xO$ (0<x<0.55) layer 12. The $Mg_{1-x}Zn_xO$ (0<x<0.55) layer 12 has a rock-salt structure and functions as a light emitting layer. The thickness of the $Mg_{1-x}Zn_xO$ (0<x<0.55) layer 12 ranges from 50 nm to 1000 nm, for example. The anode electrode 13 is formed of Al with a thickness from about 50 nm to about 100 nm, for example. In the ultraviolet light source according to the first embodiment, the side of the anode electrode 13 of the $Mg_{1-x}Zn_xO$ (0<x<0.55) layer 12 is irradiated with an electron beam, and CL light emission (vacuum ultraviolet to deep ultraviolet emission) of the $Mg_{1-x}Zn_xO$ (0<x<0.55) layer 12 is obtained from the side of the MgO substrate 11.

Reference will now be made to FIG. 8B. In the ultraviolet light source according to the first embodiment, a cathode electrode 14 is arranged so as to face the anode electrode 13, and an electron beam source 15 is arranged on the cathode electrode 14 (on the surface that faces the anode electrode 13). In addition, a gate electrode 16 is arranged on the side of the cathode electrode 14 (near the electron beam source 15). A spacer 17 is arranged between the anode electrode 13 and the cathode electrode 14 to define a space for separating the $Mg_{1-x}Zn_xO$ (0<x<0.55) layer 12 from the electron beam source 15 by 1 mm to 3 mm, for example. The space is vacuum-evacuated. The electron (electron beam) emitting unit is formed to include the anode electrode 13, the cathode electrode 14, the electron beam source 15, and the gate electrode 16.

A potential difference is caused between the electron beam source 15 and the gate electrode 16 in a state in which positive and negative voltages are applied to the electrodes 13 and 14, and the electron beam source 15 is made to emit electrons (electron beam) by field emission (cold cathode scheme). The emitted electrons (field electron 18) are made to advance toward the side of the anode electrode 13 and are then incident on the $Mg_{1-x}Zn_xO$ (0<x<0.55) layer 12. The $Mg_{1-x}Zn_xO$ (0<x<0.55) layer 12 emits light (CL light emission) by the irradiation with the electron beam emitted from the electron beam emitting unit. The wavelength of the light emission is from 180 nm to 280 nm, for example, and the intensity thereof is significantly higher than that of light emission from an MgO crystal.

As the electron beam source 15, metal-containing carbon that contains metal such as a carbon nanotube (CNT), a carbon nanowall (CNW), nanodiamond (ND), or Fe, a whisker obtained by forming an amorphous carbon-based film at a tip end of an Al:ZnO whisker, or the like can be used.

Figure 9A:
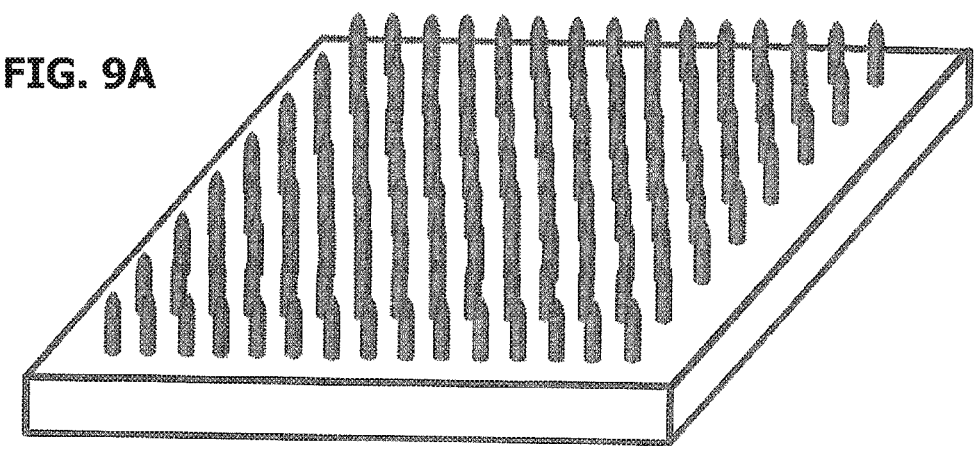
FIGS. 9A to 9C are diagrams schematically illustrating cases in which a carbon nanotube, a carbon nanowall, and nanodiamond are used, respectively, as an electron beam source.
Figure 9B:
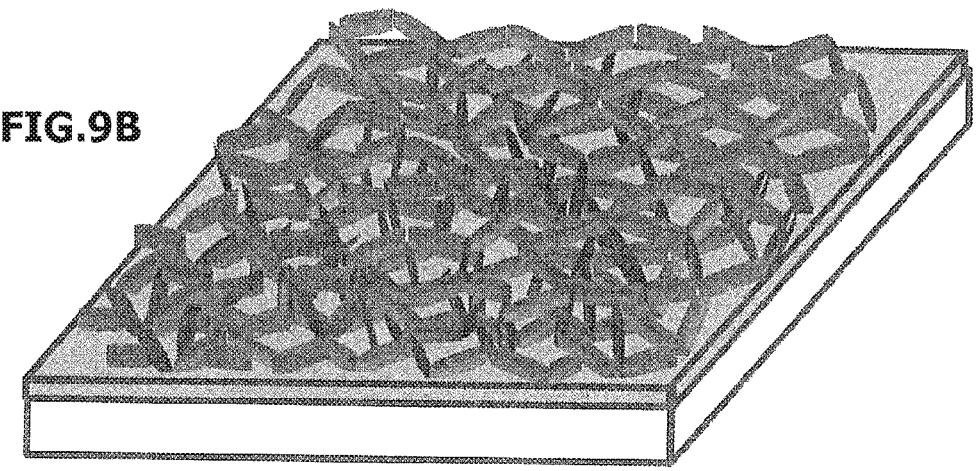
Figure 9C:
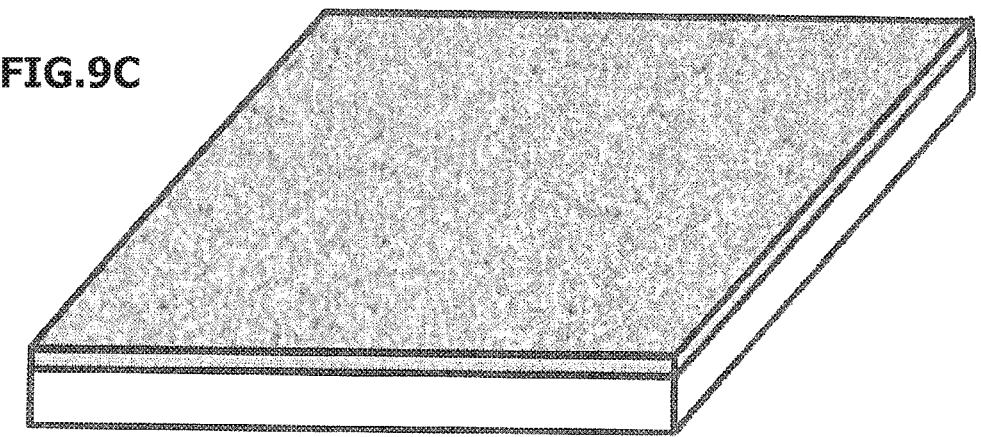

FIGS. 9A to 9C are diagrams schematically illustrating cases in which a carbon nanotube, a carbon nanowall, and nanodiamond are used, respectively, as the electron beam source 15.

As illustrated in FIG. 9A, it is possible to employ an emitter using an oriented carbon nanotube with a diameter from several nanometers to about 100 nm at the tip end. The electron beam is emitted from the tip end.

As illustrated in FIG. 9B, nanocarbon (carbon nanowall) that has been made to grow to have a wall shape with a thickness from several nanometers to several tens of nanometers may be used. In the same manner as the carbon nanotube, the electron beam is emitted from the tip end.

As illustrated in FIG. 9C, it is also possible to employ an emitter using a nanodiamond film with a thickness of several micrometers and with recesses at a pitch of several hundreds of nanometers. Variations in emission properties due to degradation in the shape do not severely occur since the emitter has a configuration in which graphite and diamond are present together and the tip end is not sharp, for example.

The cold cathode-type electron beam source made of a carbon-based material as illustrated in FIGS. 9A to 9C can be produced by a wet method, a transfer method, or a CVD method, for example.

Figure 10:
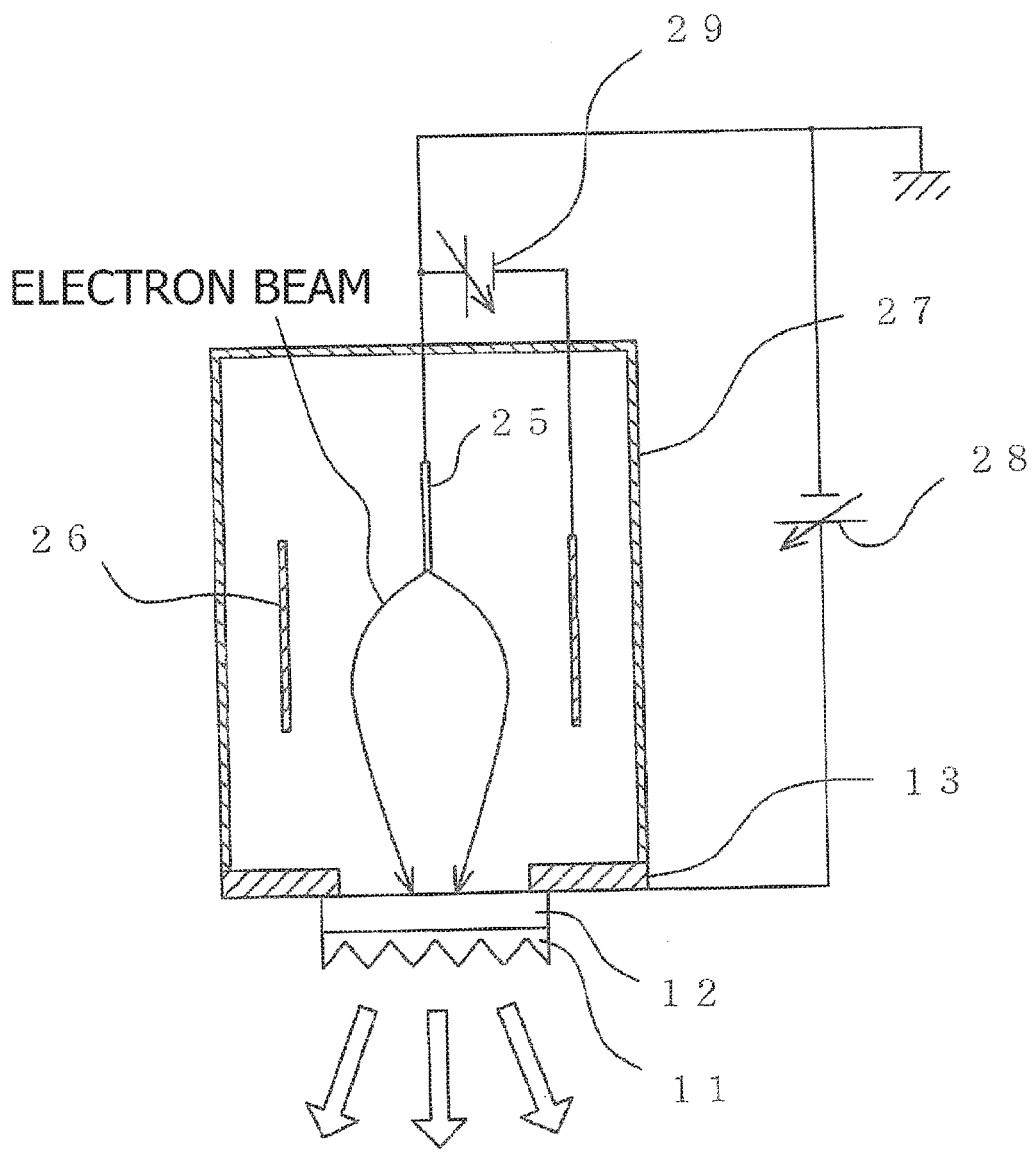
FIG. 10 is a sectional view schematically illustrating an ultraviolet light source according to a second embodiment.

FIG. 10 is a sectional view schematically illustrating an ultraviolet light source according to a second embodiment. The ultraviolet light source according to the second embodiment is a bulb-type light source as disclosed in Japanese Unexamined Patent Application Publication No. 2012-199174, for example.

In the ultraviolet light source according to the second embodiment, an MgO substrate 11, an $Mg_{1-x}Zn_xO$ (0<x<0.55) layer 12 that is formed on the MgO substrate 11, an electron emitting source 25 that is formed of a graphite nanoneedle-shaped rod, and an electrostatic lens 26 are vacuum-sealed in a glass tube 27 and an anode electrode 13 by using a stem pin. The electrostatic lens 26 is made of cylindrical metal and has a function of focusing the electron beam, which is emitted from the electron emitting source 25, on the $Mg_{1-x}Zn_xO$ (0<x<0.55) layer 12. A DC source 28 applies a DC voltage, which has a low potential when viewed from the electrons, between the anode electrode 13 and the electron emitting source 25, and a DC source 29 applies a DC current, which has a high potential when viewed from the electrons, between the electron emitting source 25 and the electrostatic lens 26. In the second embodiment, the electron (electron beam) emitting unit is formed to include the anode electrode 13, the electron emitting source 25, and the electrostatic lens 26.

Similarly, the electron beam emitted from the electron beam emitting unit is incident on the $Mg_{1-x}Zn_xO$ (0<x<0.55) layer 12, and light emission with a wavelength from 180 nm to 280 nm, for example, occurs in the second embodiment.

Each of the ultraviolet light sources according to the first and second embodiments is provided with the electron (electron beam) emitting unit that emits electrons (electron beam) and the $Mg_{1-x}Zn_xO$ (0<x<0.55) layer 12. The $Mg_{1-x}Zn_xO$ (0<x<0.55) layer 12 is arranged at a position on which the electron beam emitted from the electron beam emitting unit is incident and emits light with a wavelength from 180 nm to 280 nm, for example, by the irradiation with the electron beam. The ultraviolet light sources according to the embodiments have novel configurations, and intensity of the light emission thereof is significantly higher than that of light emission from an MgO crystal.

Although the first and second embodiments of the invention were described above, the invention is not limited thereto.

For example, the $Mg_{1-x}Zn_xO$ (0<x<0.55) layer 12 was used as the light emitting layer in the first and second embodiments. However, it is also possible to configure an ultraviolet light source capable of emitting light with a plurality of wavelengths by laminating a plurality of MgZnO layers with different x in the Zn composition as light emitting layers. It is only necessary to provide at least one $Mg_{1-x}Zn_xO$ (0<x<0.55) layer with a rock-salt structure as the light emitting layer. In addition, the $Mg_{1-x}Zn_xO$ (0<x<0.55) layer is not limited to a single crystal layer and may be a polycrystalline layer.

As an example in which a plurality of $Mg_{1-x}Zn_xO$ (0<x<0.55) layers are provided, it is possible to employ a structure in which an $Mg_{0.99}Zn_{0.10}O$ layer and an $Mg_{0.61}Zn_{0.39}O$ layer are laminated (see the second experiment). In such a case, an ultraviolet light source that emits light with a peak wavelength of about 195 nm and with a peak wavelength of about 250 nm is configured. The ultraviolet light source can be used as a light source with which a low-pressure mercury lamp with bright line spectra of 185 nm and 254 nm is replaced. Unlike the low-pressure mercury lamp, the ultraviolet light source is a light source that does not contain a harmful substance (Hg).

Furthermore, it is possible to use the light source as an alternative light source, such as an excimer lamp with a light emission wavelength of 172 nm that uses xenon, for example, as discharge gas or an excimer lamp with a light emission wavelength of 222 nm that uses krypton chloride as discharge gas by controlling the wavelength based on x in the Zn composition or by obtaining a plurality of wavelengths or widening the band by forming a plurality of $Mg_{1-x}Zn_xO$ (0<x<0.55) layers with different x in the Zn composition that have the rock-salt structures.

In addition, it is also possible to use a $Be_{1-x-y-z}Mg_yZn_xCa_zO$ (0.45≤y+z<1, 0<x≤0.55) layer as the light-emitting layer. In such a case, it is further preferable to use a $Be_{1-x-y-z}Mg_yZn_xCa_zO$ (0.5≤y<1, 0<x+z≤0.5, 0<x≤0.5) layer.

The MgO substrate 11 is used in the first and second embodiments. However, it is also possible to form the substrate by using another material that transmits the light emitted from the $Mg_{1-x}Zn_xO$ (0<x<0.55) layer 12. Specifically, it is possible use $Al_2O_3$, $SiO_2$, $MgF_2$, $CaF_2$, $BaF_2$, and LiF as well as MgO.

FIG. 11 illustrates physical properties of these substrate materials. Referring to the sections of "TRANSMISSION RANGE", for example, it is possible to recognize that these materials transmit emitted light with a wavelength from 180 nm to 280 nm from the $Mg_{1-x}Zn_xO$ (0<x<0.55) layer 12.

A description will be given of a third experiment that was conducted by the inventors. Similarly, the MBE method was used as the crystal production method in the third experiment.

Figure 12A:
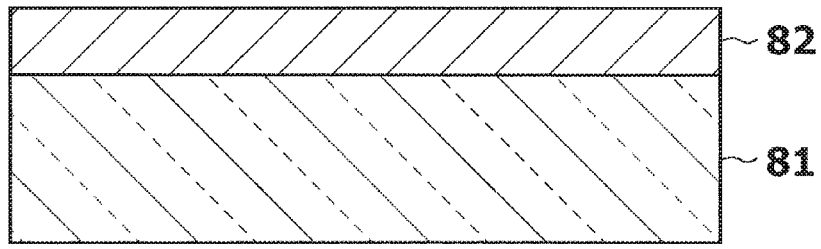
FIGS. 12A to 12C are diagrams schematically illustrating sections of samples that were used in a third experiment.
Figure 12B:
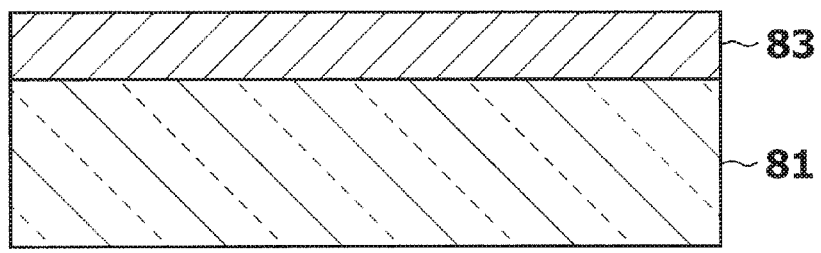
Figure 12C:
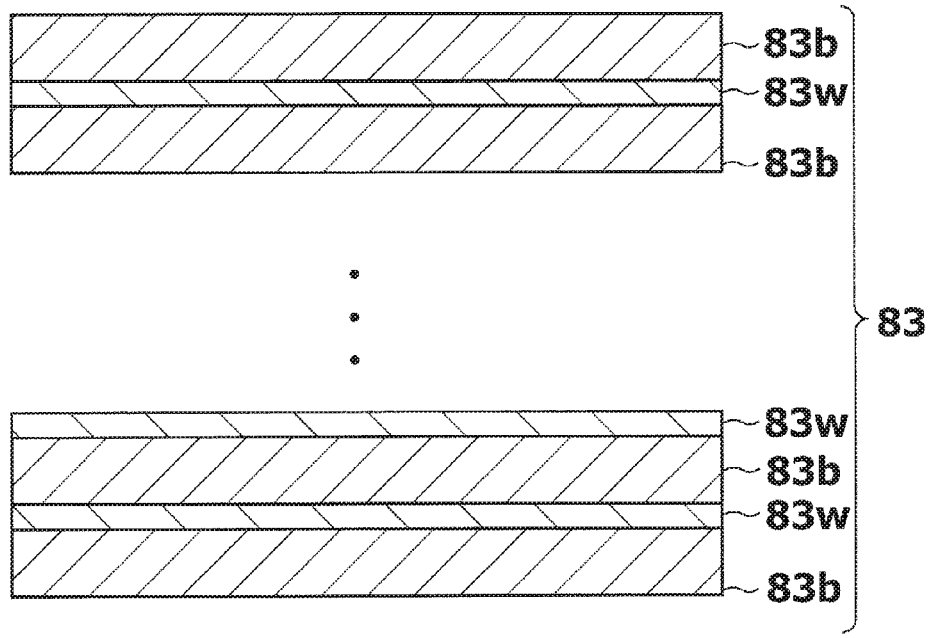

FIGS. 12A to 12C are diagrams schematically illustrating sectional views of samples that were used in the third experiment.

FIG. 12A illustrates a sectional view of Sample 1. Sample 1 was formed to include an MgO (100) substrate 81 and an MgZnO layer 82 that was formed on the MgO substrate 81.

FIG. 12B illustrates sectional views of Samples 2 and 3. Each of Samples 2 and 3 was formed to include an MgO (100) substrate 81 and a quantum well layer 83 that was formed on the MgO substrate 81.

FIG. 12C illustrates a sectional view of the quantum well layer 83. The quantum well layer 83 had a structure in which MgO barrier layers 83b and MgZnO well layers 83w were alternately laminated. Samples 2 and 3 were different from each other in the thicknesses of each MgZnO well layer 83w.

Samples 1 to 3 were produced by performing thermal cleaning on the MgO substrate 81 at 900° C. for 30 minutes in an MBE chamber, then lowering the temperature of the substrate 81 to 300° C., and forming the MgZnO layer 82 or the quantum well layer 83 on the substrate 81.

For the MgZnO layer 82 of Sample 1, Mg radical, Zn radical, and O radical were simultaneously supplied to the MgO (100) substrate 81 in the form of molecular beams at the growth temperature of 300° C., and the MgZnO layer 82 was made to grow to have a thickness of about 200 nm. The amount of the Mg beam (Mg flux) was set to 1.2 angstrom/sec, the amount of the Zn beam (Zn flux) was set to 3.8 angstrom/sec, and O radical beam irradiation conditions were set such that RF power was 300 W and the $O_2$ flow rate was 2.0 sccm.

The quantum well layer 83 of each of Samples 2 and 3 was formed by supplying Mg radical and O radical to the MgO (100) substrate 81 in the form of molecular beams at the growth temperature of 300° C. and alternately supplying Mg radical and O radical in the form of molecular beams and Mg radical, Zn radical, and O radical in the form of molecular beams to alternately form the MgO barrier layers 83b and the MgZnO well layers 83w and cause the MgO barrier layers 83b and the MgZnO well layers 83w to grow. The amount of the Mg beam was set to 1.2 angstrom/sec, the amount of the Zn beam was set to 3.8 angstrom/sec, and the O radical beam irradiation conditions were set such that RF power was 300 W and the $O_2$ flow rate was 2.0 sccm.

For forming the quantum well layer 83 in Sample 2, the growth time of each MgO barrier layer 83b was set to 270 sec, the growth time of each MgZnO well layer 83w was set to 120 sec, fifteen MgO barrier layers 83b and fifteen MgZnO well layers 83w were alternately made to grow in this order, and the MgO barrier layer 83b was made to grow for the growth time of 270 sec on the outermost surface.

For forming the quantum well layer 83 in Sample 3, the growth time of each MgO barrier layer 83b was set to 270 sec, the growth time of each MgZnO well layer 83w was set to 27 sec, fifteen MgO barrier layers 83b and fifteen MgZnO well layers 83w were alternately made to grow in this order, and the MgO barrier layer 83b was made to grow for the growth time of 270 sec on the outermost surface.

Figure 13:
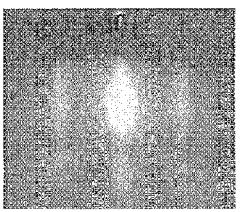
FIG. 13 illustrates RHEED images of an MgO substrate, an MgZnO layer, and a quantum well layer.
Figure 13:
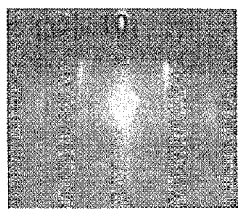
Figure 13:
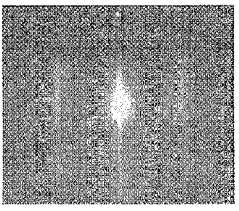
Figure 13:
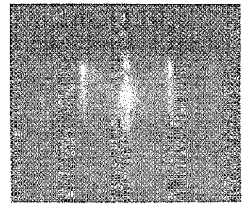
Figure 13:
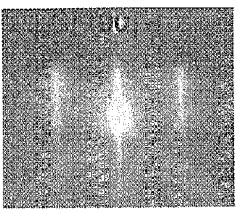
Figure 13:
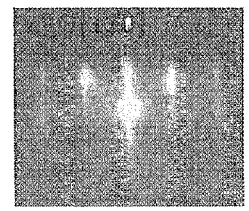
Figure 13:
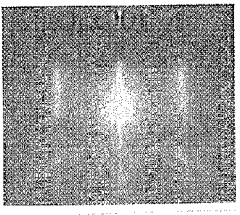
Figure 13:
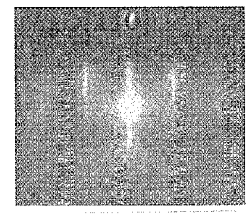

FIG. 13 illustrates RHEED images of the MgO substrate 81, the MgZnO layer 82, and the quantum well layer 83. FIG. 13 illustrates RHEED patterns of the surface of the MgO substrate 81, the surface of the MgZnO layer 82 of Sample 1, the surface of the quantum well layer 83 of Sample 2, and the surface of the quantum well layer 83 of Sample 3 in the order from the upper side. Images in a case in which the electron beam was incident from the direction [100] are shown on the left side, and images in which the electron beam was incident from the direction [110] are shown on the right side.

Not only the MgO substrate 81 but also all the RHEED images in the drawing show streak patterns. Based on this fact, it is possible to recognize that the MgZnO layer 82 of Sample 1 and the quantum well layers 83 of Samples 2 and 3 also achieved epitaxial growth by two-dimensional growth with high flatness as compared with the MgO substrate 81. That is, it is possible to recognize that the MgZnO layer 82 of Sample 1 and the quantum well layers 83 of Samples 2 and 3 grew while maintaining rock-salt structures (cubical crystals) that were crystal structures of MgO. While MgO has the rock-salt structure, ZnO has a wurtzite structure (hexagonal crystal).

Figure 14A:
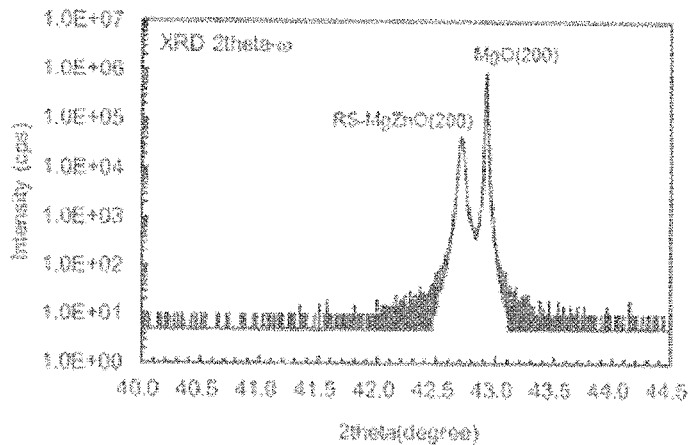
FIGS. 14A to 14C are graphs illustrating XRD patterns of an MgZnO layer of Sample 1, a quantum well layer of Sample 2, and a quantum well layer of Sample 3 in this order.
Figure 14B:
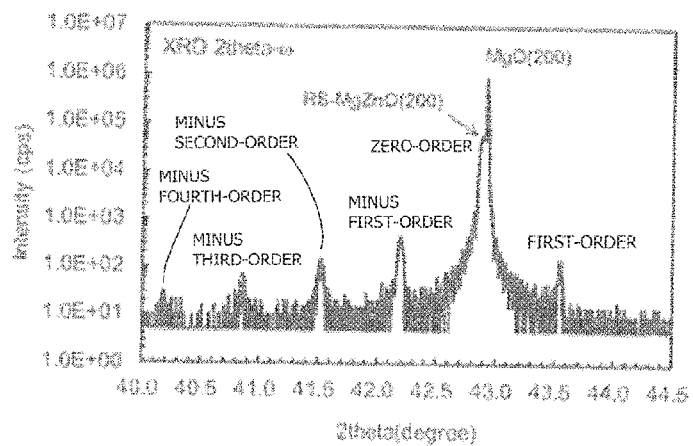
Figure 14C:
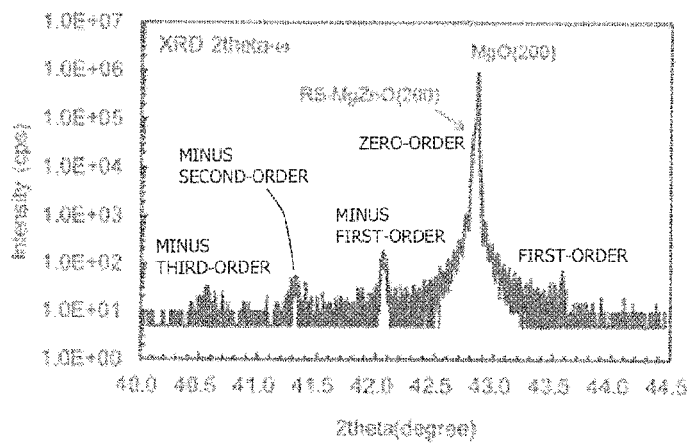

FIGS. 14A to 14C are graphs illustrating X-ray diffraction (XRD) patterns of the MgZnO layer 82 of Sample 1, the quantum well layer 83 of Sample 2, and the quantum well layer 83 of Sample 3 in this order.

Reference will now be made to FIG. 14A. The diffraction peak of the MgZnO layer 82 of Sample 1 was observed on a low-angle side of the MgO substrate. It is possible to recognize that the lattice constant increased by addition of Zn. As a result of simulation-analyzing the XRD pattern, it was possible to recognize that the Zn composition of the MgZnO layer 82 of Sample 1 corresponded to 18% (x=0.18 in the description of $Mg_{1-x}Zn_xO$).

Reference will now be made to FIGS. 14B and 14C. For the quantum well layers 83 of Samples 2 and 3, zero-order diffraction peaks were observed on the low-angle side of the MgO substrate, and furthermore, satellite peaks were clearly observed. This represents that laminated structures with satisfactory interfaces were formed.

As a result of the simulation analysis of the XRD pattern of the quantum well layer 83 of Sample 2 (see FIG. 14B), the thickness of the MgO barrier layer 83b was 12.1 nm, the thickness of the MgZnO well layer 83w was 6.1 nm, and the Zn composition of the MgZnO well layer 83w corresponded to 18% (x=0.18 in the description of $Mg_{1-x}Zn_xO$).

As a result of the simulation analysis of the XRD pattern of the quantum well layer 83 of Sample 3 (see FIG. 14C), the thickness of the MgO barrier layer 83b was 12.5 nm, the thickness of the MgZnO well layer 83w was 1.5 nm, and the Zn composition of the MgZnO well layer 83w corresponded to 19% (x=0.19 in the description of $Mg_{1-x}Zn_xO$).

Figure 15:
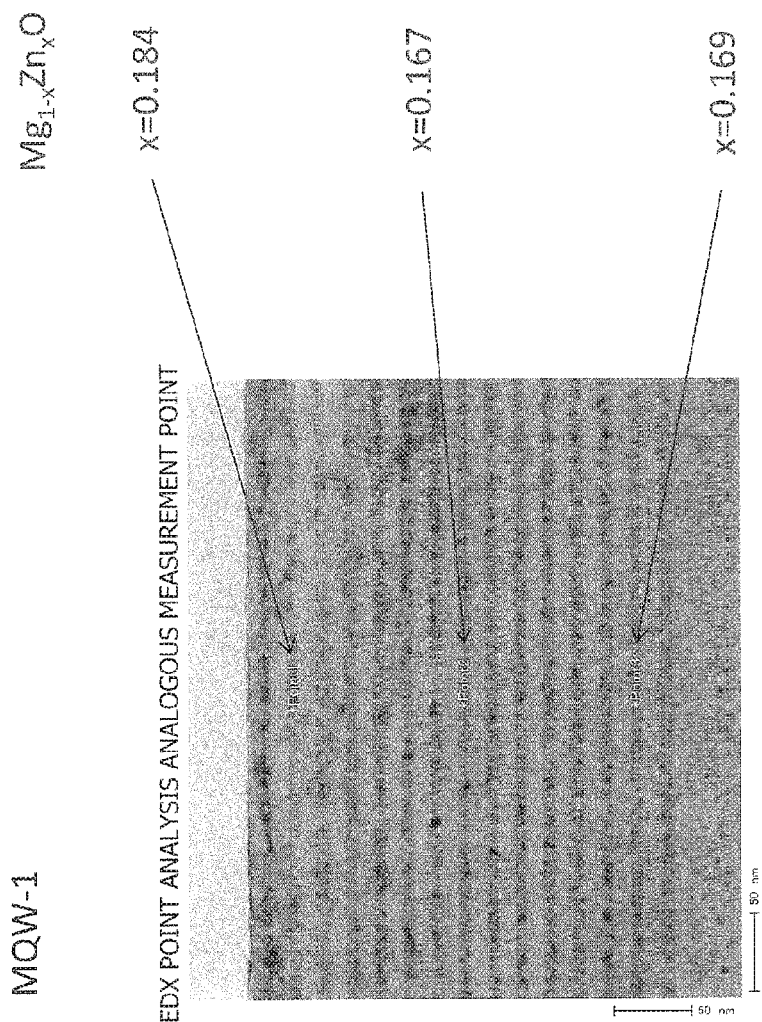
FIG. 15 illustrates a TEM image of a section of the quantum well layer of Sample 2 and a result of analysis that used EDX of the quantum well layer of Sample 2.

FIG. 15 illustrates a transmission electron microscope (TEM) image of a section of the quantum well layer 83 of Sample 2 and a result of analysis that used (energy dispersive X-ray spectroscopy) EDX of the quantum well layer 83 of Sample 2.

Reference will now be made to the TEM image (left side in FIG. 15). A laminated structure with a satisfactory interface is clearly observed. The dark color part in the TEM image corresponds to the MgZnO well layer 83w, and the light color part corresponds to the MgO barrier layer 83b. The layer thickness of the MgO barrier layer 83b was estimated to be 10.5 nm and the layer thickness of the MgZnO well layer 83w was estimated to be 7.1 nm based on the TEM image.

Reference will now be made to the analysis result of x in the Zn composition of the MgZnO well layer 83w based on the TEM-EDX (right side of FIG. 15). Measurement was performed at three points, and results that x=0.184, x=0.167, and x=0.169 were obtained. On average, x=0.173, which was close to the value (x=0.18) obtained by the simulation analysis of the XRD pattern.

Figures 16A, 16B:
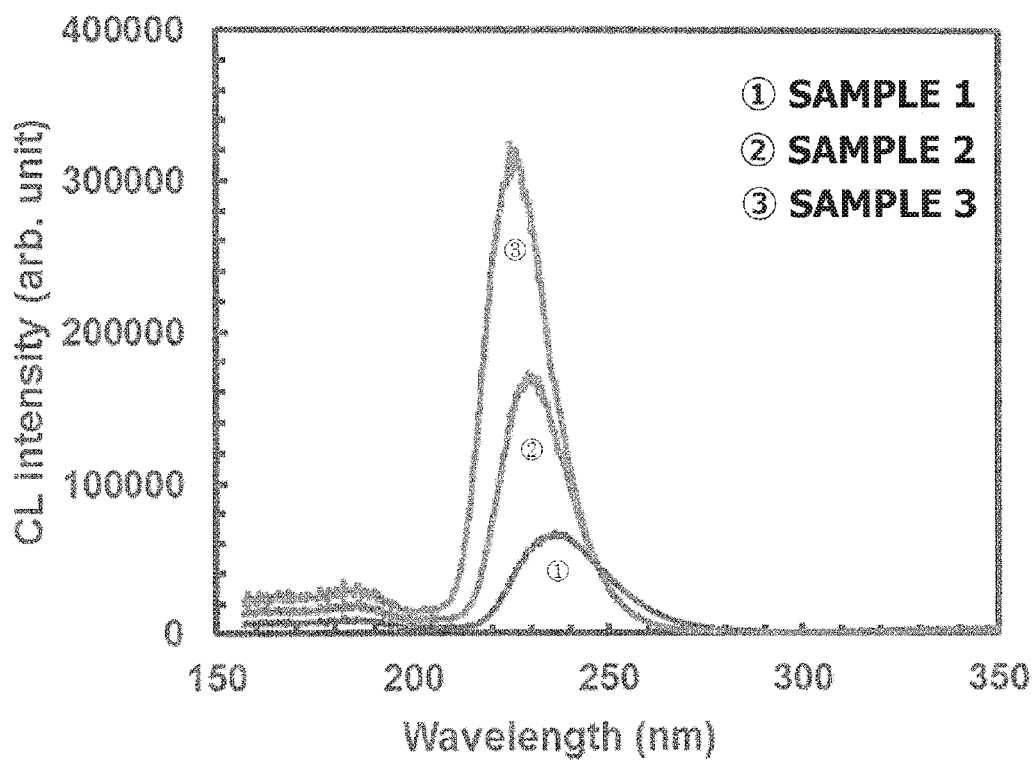
FIG. 16A is a graph illustrating CL spectra from the MgZnO layer of Sample 1 and the quantum well layers of Samples 2 and 3.
FIG. 16B is a table collectively illustrating peak wavelengths and half widths of the CL spectra.

FIG. 16A is a graph illustrating CL spectra from the MgZnO layer 82 of Sample 1 and the quantum well layers 83 of Samples 2 and 3, and FIG. 16B is a table collectively illustrating peak wavelengths and half widths of the CL spectra.

As is obvious from the graph of FIG. 16A, intensity of the light emission from the quantum well layers 83 of Samples 2 and 3 was higher than that of the light emission from the MgZnO layer 82 (single film) of Sample 1. It is possible to recognize that the intensity of the light emission was significantly enhanced by forming the quantum well structure.

Referring to the table of FIG. 16B together, decreases in the light emission peak wavelengths and decreases in the half widths were also observed in the quantum well layers 83 of Samples 2 and 3 as well as the increases in the intensity of the light emission. It is considered that a trapping effect appeared.

Reference will be made to FIGS. 4A and 4B again. As described above, the inventors obtained a second-order approximation by using a least-square method and discovered that the bandgap energy (illustrated by the solid line in FIG. 4A) of $Mg_{1-x}Zn_xO$ with the rock-salt structure (RS) was provided as the following Equation (1)

$$y=4.707x^2-7.716x+7.788 \quad (1)$$

and the CL peak energy y (illustrated by the dotted line; approximate of the circular plotting in FIG. 4A) of $Mg_{1-x}Zn_xO$ with the rock-salt structure (RS) was provided as the following Equation (2)

$$y=9.562x^2-7.413x+6.383 \quad (2).$$

The bandgap energy decreased as x in the Zn composition increased. That is, it is possible to trap a carrier by setting x in the Zn composition of the well layer to be higher than that of the barrier layer when the quantum well structure is formed. In each of the quantum well layers 83 of Samples 2 and 3, the barrier layer 83b was formed of $Mg_{1-x}Zn_xO$, where x=0, with the rock-salt structure, and the well layer 83w was formed of $Mg_{1-x}Zn_xO$, where 0<x, with the rock-salt structure.

As is obvious from FIG. 4A, the value of the CL peak energy substantially coincided with the value of the bandgap energy in the case of the $Mg_{1-x}Zn_xO$ crystal with the wurtzite structure. In contrast, the value of the CL peak energy greatly differed from the value of the bandgap energy in the case of the $Mg_{1-x}Zn_xO$ crystal with the rock-salt structure. This is considered to be because an origin of the CL light emission of the MgZnO layer was light emission by isoelectronic trap of Zn instead of band-edge light emission.

The inventors achieved knowledge that the intensity of the light emission from MgZnO was significantly higher than that from MgO in the experiment conducted while changing x in the Zn composition of the $Mg_{1-x}Zn_xO$. This is considered to be because the light emission used the isoelectronic trap, addition of Zn in a composition level as well as addition of a small amount of Zn in an impurity level thus contributed to highly efficient light emission, and the intensity of the light emission significantly increased as compared with the MgO crystal.

It is expected from Equations (1) and (2) that the CL peak energy becomes substantially the same as the bandgap energy within a range in which x in the Zn composition is equal to or greater than 0.55. That is, it is considered that Zn functions only as a composition instead of the isoelectronic trap in the $Mg_{1-x}Zn_xO$ crystal in a range of 0.55≤x. Therefore, it would be necessary for x in the Zn composition of $Mg_{1-x}Zn_xO$ to satisfy 0<x<0.55 in order to achieve highly efficient light emission using the isoelectronic trap of Zn in the MgZnO crystal. At this time, it is considered that the $Mg_{1-x}Zn_xO$ (0<x<0.55) crystal that is obtained by adding Zn to the MgO crystal with the rock-salt structure emits light on the side of the energy that is lower than the bandgap energy by 0.1 eV or more, for example, on the side of the lower energy by about 0.1 eV to 1.4 eV.

It is also considered that highly efficient light emission can be achieved by setting x in the Zn composition of the $Mg_{1-x}Zn_xO$ well layer to satisfy 0<x<0.55 in the quantum well layer that is formed by laminating the MgO barrier layers and the MgZnO well layers with the rock-salt structure.

Since it is possible to trap the carrier by wetting the Zn composition of the well layer to be higher than that of the barrier layer as described above, the barrier layer is not limited to MgO and may be formed of $Mg_{1-w}Zn_wO$ (0≤w<0.45, w<x) with the rock-salt structure. The reason that w in the Zn composition of the barrier layer is set to be less than 0.45 is to secure an energy difference from the well layer to be equal to or greater than at least 300 meV. When the Zn composition of the barrier layer is 0.45 and the Zn composition of the well layer is 0.55, for example, the bandgap energy thereof becomes 5.269 eV and 4.968 eV, respectively, based on Equation (1), and the energy difference is about 300 meV.

According to another experiment conducted by the inventors, it is possible to achieve light emission with a peak wavelength from 190 nm to 260 nm from an $Mg_{1-x}Zn_xO$ crystal by electron beam excitation within a Zn composition range of 0<x<0.55. In consideration of the bottom of the light emission spectra, the light emission with the wavelength from 180 nm to 280 nm is obtained. Here, the wavelength of the light emission can be controlled depending on x in the Zn composition, and for example, the wavelength of the light emission increases as x increases.

In the light emitting layer with the quantum well structure in which the well layers are formed of $Mg_{1-x}Zn_xO$ (0<x<0.55) with the rock-salt structure and the barrier layers are formed of $Mg_{1-w}Zn_wO$ (0≤w<0.45, w<x) with a rock-salt structure, it is possible to obtain light emission with a peak wavelength from 190 nm to 260 nm by electron beam excitation, and in consideration of the bottom of the light emission spectra, it is possible to obtain light emission with a wavelength from 180 nm to 280 nm (light emission in a vacuum ultraviolet to deep ultraviolet region).

The quantum well structure in which the well layers each formed of the $Mg_{1-x}Zn_xO$ (0<x<0.55) single crystal with the rock-salt structure and the barrier layers each formed of the $Mg_{1-w}Zn_wO$ (0≤w<0.45, w<x) single crystal with the rock-salt structure are alternately laminated can be used as an ultraviolet light emitting material that emits light in the vacuum ultraviolet to deep ultraviolet region with higher light emission intensity than that of an MgZnO single film, for example.

Furthermore, although the quantum well structures using the $Mg_{1-x}Zn_xO$ crystals were formed in Samples 2 and 3, group II elements other than Zn, such as Be or Ca, may be contained along with the MgO crystal as a base.

Reference will be made to FIGS. 7A and 7B again.

Referring to FIG. 7A, for example, it is possible to recognize that the bandgap can be significantly changed by adding at least one element from among Zn, Ca, and Be To the RS-MgO at the center. In addition, it is possible to achieve crystal growth with the coherent lattice matching property of a consistent lattice constant by using mixed crystals obtained by adding two or more elements therefrom.

In order to maintain the rock-salt structure as the crystal structure, it is preferable that Mg composition is equal to or greater than 50%. That is, it is preferable to satisfy $0.5 \le y \le 1$ and $0 \le x+z \le 0.5$ in the composition formula $Be_{1-x-y-z}Mg_yZn_xCa_zO$. The composition can be arbitrarily changed within the range depending on the lattice constant and the bandgap.

The quantum well structure obtained by alternately laminating the well layers and the barrier layers, each of which is formed of the $Be_{1-x-y-z}Mg_yZn_xCa_zO$ ($0.5 \le y \le 1$, $0 \le x+z \le 0.5$) single crystal with the rock-salt structure that is obtained by adding at least one element from among Zn, Be, and Ca to MgO with the rock-salt structure, can be used as an ultraviolet light emitting material that emits light in the vacuum ultraviolet to deep ultraviolet region with high light emission intensity.

In the quantum well structure, each well layer is formed of a $Be_{1-x-y-z}Mg_yZn_xCa_zO$ ($0.5 \le y \le 1$, $0 \le x+z \le 0.5$) single crystal, and each barrier layer is formed of a $Be_{1-x-y-z}Mg_yZn_xCa_zO$ ($0.6 \le y \le 1$, $0 \le x+z \le 0.4$) single crystal, for example. The compositions of the well layers and the barrier layers are adjusted as described above to secure the energy difference between the well layers and the barrier layers for the purpose of trapping the carrier (electrons) and causing the electrons to efficiently emit light.

Figure 17A:
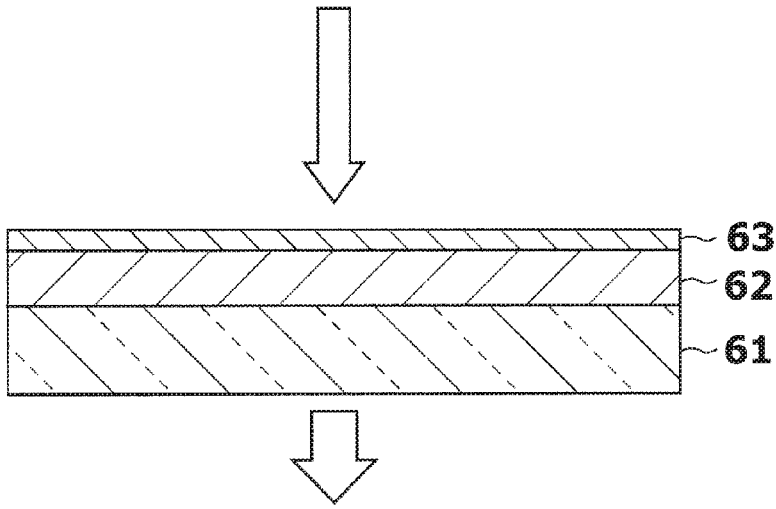
FIGS. 17A and 17B are sectional views schematically illustrating an ultraviolet light source according to a third embodiment.
Figure 17B:
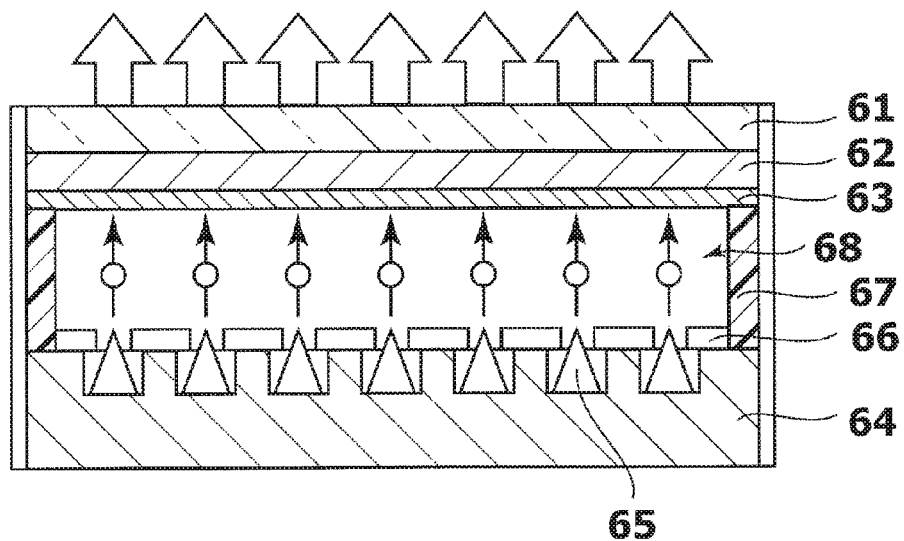

FIGS. 17A and 17B are sectional views schematically illustrating an ultraviolet light source according to a third embodiment. The ultraviolet light source according to the third embodiment is a panel-shaped light source.

As illustrated in FIG. 17A, the ultraviolet light source according to the third embodiment is formed to include an MgO substrate 61, a quantum well layer 62 that is formed on the MgO substrate 61, and an anode electrode 63 that is formed on the quantum well layer 62.

The quantum well layer 62 is a quantum well layer in which well layers, each of which is formed of an $Mg_{1-x}Zn_xO$ ($0 < x < 0.55$) single crystal with the rock-salt structure and barrier layers, each of which is formed of an $Mg_{1-w}Zn_wO$ ($0 \le w < 0.45$, $w < x$) single crystal with the rock-salt structure, for example, are alternately laminated. The quantum well layer 62 functions as a light emitting layer. The thickness of the quantum well layer 62 ranges from 50 nm to 1000 nm, for example. The anode electrode 63 is formed of Al with a thickness from about 50 nm to about 100 nm, for example. In the ultraviolet light source according to the third embodiment, the side of the anode electrode 63 of the quantum well layer 62 is irradiated with an electron beam, and CL light emission (vacuum ultraviolet to deep ultraviolet emission) of the quantum well layer 62 is obtained from the side of the MgO substrate 61.

Reference will now be made to FIG. 17B. In the ultraviolet light source according to the third embodiment, a cathode electrode 64 is arranged so as to face the anode electrode 63, and an electron beam source 65 is arranged on the cathode electrode 64 (on the surface that faces the anode electrode 63). In addition, a gate electrode 66 is arranged on the side of the cathode electrode 64 (near the electron beam source 65). A spacer 67 is arranged between the anode electrode 63 and the cathode electrode 64 to define a space that separates the quantum well layer 62 from the electron beam source 65 by 1 mm to 3 mm, for example. The space is vacuum-evacuated. The electron (electron beam) emitting unit is formed to include the anode electrode 63, the cathode electrode 64, the electron beam source 65, and the gate electrode 66.

A potential difference is caused between the electron beam source 65 and the gate electrode 66 in a state in which positive and negative voltages are applied to the electrodes 63 and 64, and the electron beam source 65 is made to emit electrons (electron beam) by field emission (cold cathode scheme). The emitted electrons (field electron 68) are made to advance toward the side of the anode electrode 63 and are then incident on the quantum well layer 62. The quantum well layer 62 emits light (CL light emission) by the irradiation with the electron beam emitted from the electron beam emitting unit. The wavelength of the light emission is from 180 nm to 280 nm, for example, and the intensity thereof is significantly higher than that of light emission from an MgZnO single film.

As the electron beam source 65, metal-containing carbon that contains metal such as a carbon nanotube (CNT), a carbon nanowall (CNW), nanodiamond (ND), or Fe, a whisker obtained by forming an amorphous carbon-based film at a tip end of an Al:ZnO whisker, or the like can be used.

The content described with reference to FIGS. 9A to 9C can also be applied to the third embodiment.

Figure 18:
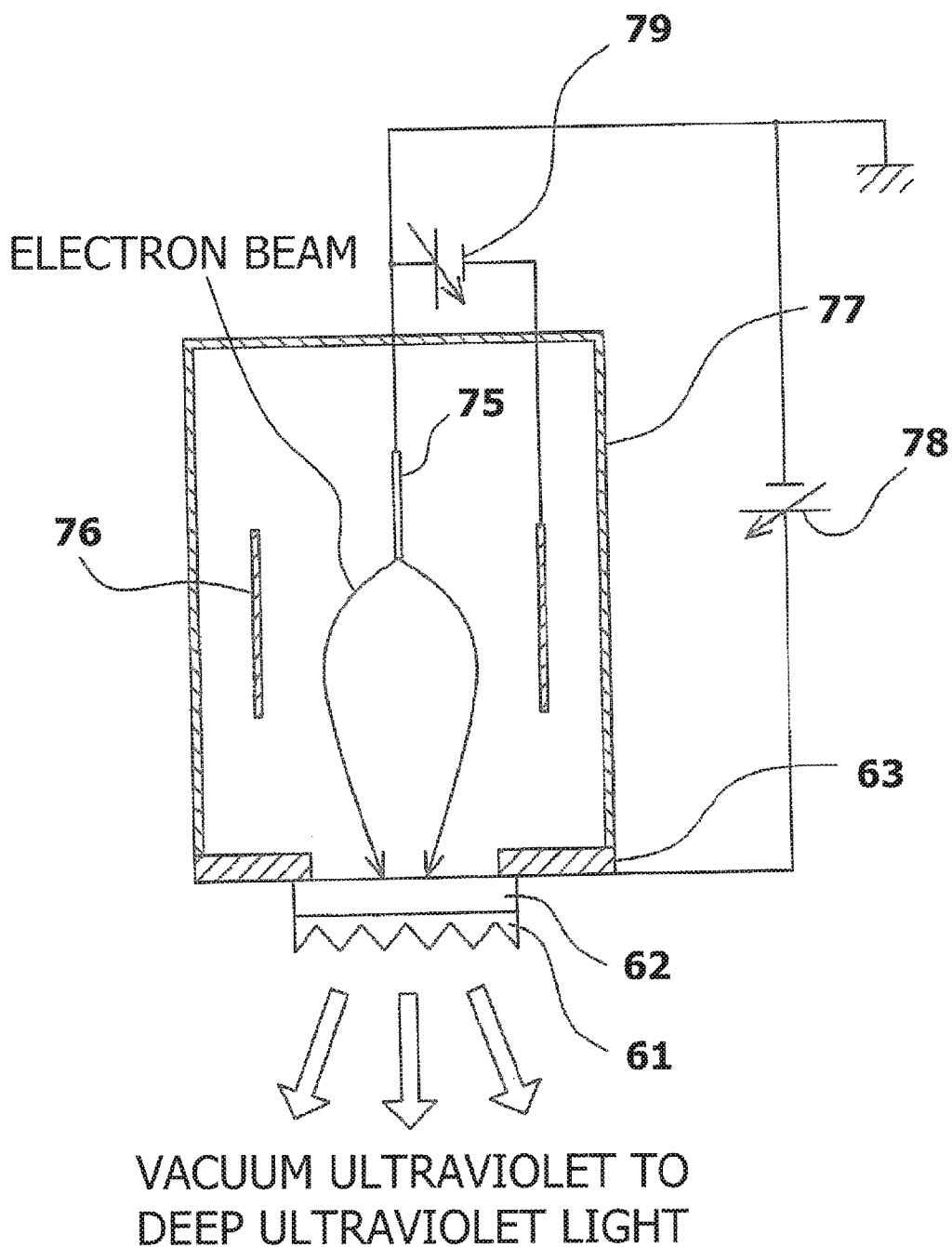
FIG. 18 is a sectional view schematically illustrating an ultraviolet light source according to a fourth embodiment.

FIG. 18 is a sectional view schematically illustrating an ultraviolet light source according to a fourth embodiment. The ultraviolet light source according to the fourth embodiment is a bulb-type light source as disclosed in Japanese Unexamined Patent Application Publication No. 2012-199174, for example.

In the ultraviolet light source according to the fourth embodiment, an MgO substrate 61, a quantum well layer 62 that is formed on the MgO substrate 61, an electron emitting source 75 that is formed of a graphite nanoneedle-shaped rod, and an electrostatic lens 76 are vacuum-sealed in a glass tube 77 and an anode electrode 63 by using a stem pin. The electrostatic lens 76 is made of cylindrical metal and has a function of focusing the electron beam, which is emitted from the electron emitting source 75, on the quantum well layer 62. A DC source 78 applies a DC voltage, which has a low potential when viewed from the electrons, between the anode electrode 63 and the electron emitting source 75, and a DC source 79 applies a DC current, which has a high potential when viewed from the electrons, between the electron emitting source 75 and the electrostatic lens 76. In the fourth embodiment, the electron (electron beam) emitting unit is formed to include the anode electrode 63, the electron emitting source 75, and the electrostatic lens 76.

Similarly, the electron beam emitted from the electron beam emitting unit is incident on the quantum well layer 62, and light emission with a wavelength from 180 nm to 280 nm, for example, occurs in the fourth embodiment.

Each of the ultraviolet light sources according to the third and fourth embodiments is provided with the electron (electron beam) emitting unit that emits electrons (electron beam) and the quantum well layer 62. The quantum well layer 62 is arranged at a position on which the electron beam emitted from the electron beam emitting unit is incident and emits light with a wavelength from 180 nm to 280 nm, for example, by the irradiation with the electron beam. The ultraviolet light sources according to the third and fourth embodiments have novel configurations, and intensity of the light emission thereof is significantly higher than that of light emission from an MgZnO single film.

Although the third and fourth embodiments of the invention were described above, the invention is not limited thereto.

For example, multiple quantum well (MQW) structures are employed for the quantum well layers in the third and fourth embodiments. However, a single quantum well (SQW) structure may be used.

In the third and fourth embodiments, the quantum well structure obtained by alternately laminating the well layers, each of which is formed of the $Mg_{1-x}Zn_xO$ ($0<x<0.55$) single crystal with the rock-salt structure, and the barrier layers, each of which is formed of the $Mg_{1-w}Zn_wO$ ($0 \leq w<0.45$, $w<x$) single crystal with the rock-salt structure, is used. However, it is also possible to form the well layers with different Zn compositions at this time, for example. The Zn compositions of the barrier layers may be different from each other. An ultraviolet light source capable of emitting light with a plurality of wavelengths can be formed (a plurality of light emission wavelengths can be selected, and the band can be widened).

Furthermore, a quantum well layer obtained by laminating the well layers and the barrier layers, each of which is formed of a $Be_{1-x-y-z}Mg_yZn_xCa_zO$ ($0.5 \leq y \leq 1$, $0 \leq x+z \leq 0.5$) single crystal with the rock-salt structure, may be used as the light emitting layer. For example, each well layer is formed of a $Be_{1-x-y-z}Mg_yZn_xCa_zO$ ($0.5 \leq y \leq 1$, $0 \leq x+z \leq 0.5$) single crystal, and each barrier layer is formed of a $Be_{1-x-y-z}Mg_yZn_xCa_zO$ ($0.6 \leq y \leq 1$, $0 \leq x+z \leq 0.4$) single crystal.

The MgO substrate 61 is used in the third and fourth embodiments. However, it is also possible to form the substrate by using another material that transmits the light emitted from the quantum well layer 62. Specifically, it is possible to use $Al_2O_3$, $SiO_2$, $MgF_2$, $CaF_2$, $BaF_2$, and LiF as well as MgO.

Referring to the sections of "TRANSMISSION RANGE" in FIG. 11, for example, it is possible to recognize that these materials transmit emitted light with a wavelength from 180 nm to 280 nm from the quantum well layer 62.

It will be obvious to those skilled in the art that various modifications, improvements, and combinations can be made.

For example, it is possible to use the ultraviolet light source as a vacuum ultraviolet light source or a deep ultraviolet light source. The ultraviolet light source can be suitably used as a light source with which a mercury lamp or an excimer lamp is replaced.

What we claim are:

1. An ultraviolet-emitting material with a quantum well structure comprising:
   a well layer and a barrier layer that are formed of a $Be_{1-x-y-z}Mg_yZn_xCa_zO$ ($0.5 \leq y \leq 1$, $0 \leq x+z \leq 0.5$) single crystal with a rock-salt structure.

2. The ultraviolet-emitting material according to claim 1, wherein the well layer is formed of a $Be_{1-x-y-z}Mg_yZn_xCa_zO$ ($0.5 \leq y \leq 1$, $0 \leq x+z \leq 0.5$) single crystal, and
   wherein the barrier layer is formed of a $Be_{1-x-y-z}Mg_yZn_xCa_zO$ ($0.6 \leq y \leq 1$, $0 \leq x+z \leq 0.4$) single crystal.

3. An ultraviolet light source comprising:
   an electron beam emitting unit that emits an electron beam; and
   (i) a light emitting layer with a quantum well structure that includes a well layer formed of an $Mg_{1-x}Zn_xO$ ($0<x<0.55$) single crystal with a rock-salt structure and a barrier layer formed of an $Mg_{1-w}Zn_wO$ ($0 \leq w<0.45$, $w<x$) single crystal with a rock-salt structure or (ii) a light emitting layer with a quantum well structure that includes a well layer and a barrier layer, each of which is formed of a $Be_{1-x-y-z}Mg_yZn_xCa_zO$ ($0.5 \leq y \leq 1$, $0 \leq x+z \leq 0.5$) single crystal with a rock-salt structure, (i) the light emitting layer or (ii) the light emitting layer being arranged at a position on which the electron beam emitted from the electron beam emitting unit is incident.

4. The ultraviolet light source according to claim 3, wherein (i) the light emitting layer or (ii) the light emitting layer is arranged on a substrate that is formed of MgO, $Al_2O_3$, $SiO_2$, $MgF_2$, $CaF_2$, $BaF_2$, or LiF.

5. The ultraviolet light source according to claim 3, wherein the electron beam emitting unit contains a carbon-based material as an electron beam source.

6. The ultraviolet light source according to claim 3, wherein (i) the light emitting layer or (ii) the light emitting layer emits light with a wavelength from 180 nm to 280 nm by irradiation with the electron beam emitted from the electron beam emitting unit.

7. An ultraviolet light source comprising:
   an electron beam emitting unit that emits an electron beam; and
   an $Mg_{1-x}Zn_xO$ ($0<x<0.55$) light emitting layer with a rock-salt structure or a $Be_{1-x-y-z}Mg_yZn_xCa_zO$ ($0.45 \leq y+z<1$, $0<x \leq 0.55$) light emitting layer with a rock-salt structure, each light emitting layer being arranged at a position on which the electron beam emitted from the electron beam emitting unit is incident.

8. The ultraviolet light source according to claim 7, wherein the $Mg_{1-x}Zn_xO$ ($0<x<0.55$) light emitting layer with the rock-salt structure or the $Be_{1-x-y-z}Mg_yZn_xCa_zO$ ($0.45 \leq y+z<1$, $0<x \leq 0.55$) light emitting layer with the rock-salt structure is arranged on a substrate that is formed of MgO, $Al_2O_3$, $SiO_2$, $MgF_2$, $CaF_2$, $BaF_2$, or LiF.

9. The ultraviolet light source according to claim 7, wherein the electron beam emitting unit contains a carbon-based material as an electron beam source.

10. The ultraviolet light source according to claim 7, wherein the $Mg_{1-x}Zn_xO$ ($0<x<0.55$) light emitting layer with the rock-salt structure or the $Be_{1-x-y-z}Mg_yZn_xCa_zO$ ($0.45 \leq y+z<1$, $0<x \leq 0.55$) light emitting layer with the rock-salt structure emits light with a wavelength from 180 nm to 280 nm by irradiation with the electron beam emitted from the electron beam emitting unit.

11. An ultraviolet light source comprising:
   an electron beam emitting unit that emits an electron beam; and
   a light emitting layer with a quantum well structure that includes a well layer and a barrier layer, each of which is formed of a $Be_{1-x-y-z}Mg_yZn_xCa_zO$ ($0.5 \leq y \leq 1$, $0 \leq x+z \leq 0.5$) single crystal with a rock-salt structure, the light emitting layer being arranged at a position on which the electron beam emitted from the electron beam emitting unit is incident.

12. The ultraviolet light source according to claim 11, wherein the light emitting layer is arranged on a substrate that is formed of MgO, $Al_2O_3$, $SiO_2$, $MgF_2$, $CaF_2$, $BaF_2$, or LiF.

13. The ultraviolet light source according to claim 11, wherein the electron beam emitting unit contains a carbon-based material as an electron beam source.

14. The ultraviolet light source according to claim 11, wherein the light emitting layer emits light with a wavelength from 180 nm to 280 nm by irradiation with the electron beam emitted from the electron beam emitting unit.

15. An ultraviolet light source comprising:

an electron beam emitting unit that emits an electron beam; and a $Be_{1-x-y-z}Mg_yZn_xCa_zO$ ($0.45 \leq y+z < 1$, $0 < x \leq 0.55$) light emitting layer with a rock-salt structure, the light emitting layer being arranged at a position on which the electron beam emitted from the electron beam emitting unit is incident.

16. The ultraviolet light source according to claim 15, wherein the light emitting layer is arranged on a substrate that is formed of MgO, $Al_2O_3$, $SiO_2$, $MgF_2$, CaF2, BaF2, or LiF.

17. The ultraviolet light source according to claim 15, wherein the electron beam emitting unit contains a carbon-based material as an electron beam source.

18. The ultraviolet light source according to claim 15, wherein the light emitting layer emits light with a wavelength from 180 nm to 280 nm by irradiation with the electron beam emitted from the electron beam emitting unit.

\* \* \* \* \*